United States Patent Office 3,403,179
Patented Sept. 24, 1968

3,403,179
NOVEL 7 - (1,2 - BIS - SUBSTITUTED - HYDRAZINO) - TETRACYCLINES AND METHODS OF PREPARING SAME
Ronald Theodore Zambrano, Paterson, N.J., assignor to American Cyanamid Company, Stamford, Conn., a corporation of Maine
No Drawing. Filed Jan. 10, 1967, Ser. No. 608,264
10 Claims. (Cl. 260—559)

ABSTRACT OF THE DISCLOSURE

This disclosure describes compounds of the class of 7-(1,2-bis-substituted-hydrazino)tetracyclines and 7-(1,2-bis-substituted-hydrazino)-11a-halotetracyclines, useful as intermediates in the preparation of the biologically active 7-mono(lower alkyl)aminotetracyclines and 7-di(lower alkyl)aminotetracyclines.

BRIEF SUMMARY OF THE INVENTION

This invention relates to new compounds of the tetracycline family and, more particularly, is concerned with novel substituted 7-(1,2 - bis-substituted-hydrazino)tetracyclines which may be represented by the following general formulae:

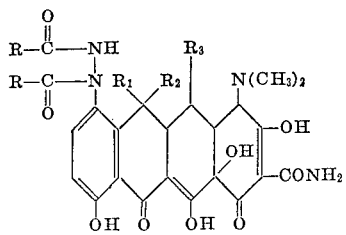

(I)

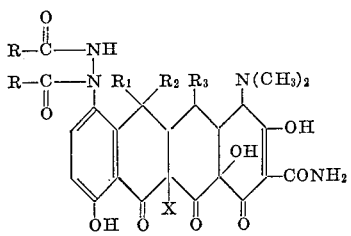

(II)

wherein R is lower alkoxy, phenyl lower alkoxy, phenoxy, amino, lower alkyl amino, phenyl lower alkyl amino or anilino; $R_1$ is hydrogen, $\alpha$-methyl or $\beta$-methyl; $R_2$ is hydrogen or $\beta$-hydroxy with the proviso that when $R_1$ is $\beta$-methyl then $R_2$ is hydrogen; $R_1$ and $R_2$ taken together is methylene; $R_3$ is hydrogen or hydroxy with the proviso that when $R_3$ is hydroxy then $R_1$ is methyl or $R_1$ and $R_2$ taken together is methylene; and X is fluoro, chloro or bromo.

DETAILED DESCRIPTION OF THE INVENTION

In the general Formulae I and II set forth above, suitable lower alkyl amino and lower alkoxy groups contemplated by the present invention are those having up to about 6 carbon atoms such as, for example, methoxy, ethoxy, n-butoxy, methylamino, ethylamino, iso-butylamino, etc. Suitable phenyl lower alkoxy groups may be, for example, benzyloxy, $\beta$-phenylethoxy, $\alpha$-phenylethoxy, etc. Suitable phenyl lower alkyl amino groups may be, for example, benzylamino, $\beta$-phenylethylamino, $\beta$-phenyl-n-propylamino, etc. Typical compounds represented by the above general Formulae I and II are, for example, 7-[1,2-bis-(carbomethoxy)hydrazino]-5-hydroxytetracycline,
7-[1,2-bis-(carbethoxy)hydrazino]-6-demethyl-6-deoxytetracycline,
7-[1,2-bis-(carbomethoxy)hydrazino]-$\alpha$-6-deoxy-11a-chlorotetracycline,
7-[1,2-bis-(carbethoxy)hydrazino]-5-hydroxy-$\alpha$-6-deoxy-11a-bromotetracycline,
7-[1,2-bis-(carbophenoxy)hydrazino]-6-demethyl-11a-fluorotetracycline,
7-[1,2-bis-(carbophenoxy)hydrazino]-$\beta$-6-deoxy-11a-chlorotetracycline,
7-[1,2-bis-(carbophenoxy)hydrazino]-6-demethyl-6-deoxy-6-methylenetetracycline,
7-[1,2-bis-(carbobenzyloxy)hydrazino]-5-hydroxy-11a-bromotetracycline,
7-[1,2-bis-(carbo-$\beta$-phenethoxy hydrazino]-$\beta$-6-deoxytetracycline,
7-[1,2-bis-(carbobenzyloxy)hydrazino]-5-hydroxy-$\alpha$-6-deoxytetracycline,
7-[1,2-bis-(carbamoyl)hydrazino]-6-demethyl-11a-fluorotetracycline,
7-[1,2-bis-(carbamoyl)hydrazino]-$\alpha$-6-deoxy-11a-bromotetracycline
7-[1,2-bis-(carbamoyl)hydrazino]-$\beta$-6-deoxytetracycline,
7-[1,2-bis-(ethylcarbamoyl)hydrazino]-6-demethyl-6-deoxytetracycline,
7-[1,2-bis-(methylcarbamoyl)hydrazino]-5-hydroxy-6-demethyl-6-deoxy-6-methylenetetracycline,
7-[1,2-bis-(benzylcarbamoyl)hydrazino]-6-demethyl-6-deoxy-11a-chlorotetracycline,
7-[1,2-bis-($\beta$-phenethylcarbamoyl)hydrazino]-6-demethyl-6-deoxy-6-methylenetetracycline, and
7-[1,2-bis-(phenylcarbamoyl)hydrazino]-6-demethyl-6-deoxytetracycline.

These new tetracycline derivatives may be prepared by a novel process comprising interacting a compound of the following general formulae:

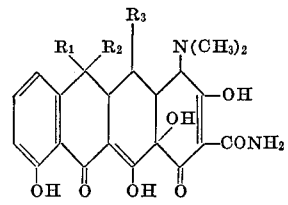

(III)

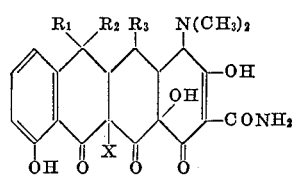

(IV)

wherein $R_1$, $R_2$, $R_3$ and X are as hereinabove defined, with a substituted azodicarbonyl derivative of the general formula:

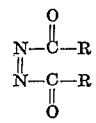

(V)

wherein R is as hereinabove defined. This reaction is conveniently carried out in an acidic medium. The duration and temperature of the reaction is largely determined by the stability and reactivity of the azodicarbonyl derivative employed, and this is determined by trial and error using paper chromatographic and other evidence for the disappearance of the substrate and reagent and the appearance of the desired product. In general, with the azodicarbonyl derivatives of poor stability and high reactivity, the reaction is best carried out at temperatures of 0° C. or less for a period of time not exceeding several hours. With the more stable azodicarbonyl derivatives, room temperature may be employed for relatively short periods of time not exceeding one hour. The acidic medium consists primarily of a strong acid such as concentrated sulfuric acid, trifluoroacetic acid, methanesulfonic acid, 50% sulfuric acid, glacial acetic acid with concentrated sulfuric acid, 70% perchloric acid, and the like. Where needed, varying amounts of an inert solvent may be added to the acidic medium for purposes of solubilizing the reactants. Suitable inert solvents are, for example, benzene, toluene, dioxane, chloroform, carbon tetrachloride, dimethylformamide, tetrahydrofuran, and the like.

The novel compounds of the present invention are useful intermediates in the preparation of the corresponding 7-aminotetracyclines by treatment of a compound of Formula I or II with 57% hydriodic acid at about 100° C. for about an hour or more. The properties of these corresponding 7-aminotetracyclines are more fully set forth in the copending application of Petisi and Boothe, Ser. No. 65,584, filed Oct. 28, 1960, now U.S. Patent 3,338,963.

The novel compounds of the present invention are also useful intermediates in the preparation of the biologically active 7-mono(lower alkyl)aminotetracyclines and 7-di(lower alkyl)aminotetracyclines by a reductive alkylation process comprising interacting a compound of the general Formulae I and II, set forth above, with a carbonyl compound of the general formula:

(VI)

wherein $R_4$ is hydrogen or lower alkyl and $R_5$ is hydrogen or lower alkyl, in the presence of a reducing agent. In this context, it is to be understood that the term "lower alkyl" is meant to include all lower alkyl groups having up to about 6 carbon atoms. Accordingly, aldehydes and ketones useful in carrying out this reductive alkylation are, for example, formaldehyde, acetaldehyde, propionaldehyde, n-butyraldehyde, acetone, methyl ethyl ketone, diethyl ketone, etc.

The reductive alkylation process may be accomplished by either chemical or catalytic reduction using procedures well-known to those in the art. Catalytic reduction, which is especially suited for the reductive alkylation of the tetracycline starting compounds set forth above, may be accomplished in a solvent for the tetracycline starting compound in the presence of a carbonyl compound and a metal catalyst and hydrogen gas at pressures from atmospheric to super-atmospheric. Ordinarily, the reductive alkylation is conveniently carried out at hydrogen pressures of from about one to about four atmospheres. Temperature does not appear to be critical in the catalytic hydrogenation. Temperatures of from 0° C. to 50° C., and usually room temperature, are preferred since they generally give best results. The metal catalyst may be of the base metal type, such as nickel or copper chromite, or it may be of the noble metal type, such as finely divided platinum, palladium or rhodium. The noble metal catalysts are advantageously employed on a carrier such as finely divided alumina, activated charcoal, diatomaceous earth, etc., in which form they are commonly available. The hydrogenation is carried out until the desired amount of hydrogen gas is absorbed at which point the hydrogenation is stopped. The solvents selected for the catalytic reduction should be reaction-inert, that is, they should not be capable of reacting with the starting materials, product, or hydrogen under the conditions of the reaction. A variety of solvents may be used for this purpose and minimum laboratory experimentation will permit the selection of a suitable solvent for any specific tetracycline starting compound. Generally, the catalytic reductive alkylation may be carried out in solvents such as water, lower alkanols, e.g. methanol, ethanol; lower alkoxy lower akanols, e.g. 2-methoxyethanol, 2-ethoxyethanol; tetrahydrofuran, dioxane, dimethylformamide, etc.

A variety of chemical reducing agents may be used in the reductive alkylation process. These include reduction with active metals in mineral acids, e.g. zinc, tin, or iron in hydrochloric acid; reduction with metal couples such as the copper-zinc couple, the tin-mercury couple, aluminum amalgam, or magnesium amalgam; and reduction with formic acid. Of these, reduction with zinc and hydrochloric acid and reduction with formic acid are preferred. When aqueous systems are used in the aforementioned chemical reductive alkylations, it is at times desirable to utilize a water-miscible organic solvent, particularly when the tetracycline starting compound is of limited solubility in the reaction mixture. The water-miscible solvent does not alter the course of the reduction but merely provides for more efficient reduction, e.g. a shorter reaction time by providing more intimate contact of the reagents. A large number of such solvents are available for this purpose and include, among others, dimethylformamide, dimethoxyethane, methanol, ethanol, dioxane, tetrahydrofuran, and the like.

Whether a 7-mono(lower alkyl)aminotetracycline or a 7-di(lower alkyl)aminotetracycline is obtained is dependent upon the ratio of carbonyl compound employed per mole of 7-(1,2-bis-substituted-hydrazino)tetracycline starting material and upon the degree of hydrogen absorption when catalytic reduction is employed. For example, a mole per mole ratio of carbonyl compound to 7-(1,2-bis-substituted-hydrazino)tetracycline favors the formation of the 7-mono(lower alkyl)amino derivative whereas the use of an excess of carbonyl compound favors the formation of the 7-di(lower alkyl)amino derivative. In like manner, a minimum hydrogen absorption indicates the formation of the 7-mono(lower alkyl)amino derivative whereas hydrogen absorption ad libitum indicates the formation of the 7-di(lower alkyl)amino derivative.

The 7-mono(lower alkyl)aminotetracyclines and 7-di(lower alkyl)aminotetracyclines are obtained from the reductive alkylation reaction mixtures by standard procedures. For example, the products may be isolated from the catalytic hydrogenation reaction mixtures, after filtration of the catalyst, by precipitation with a solvent such as ether or hexane or by concentration, usually under reduced pressure, or by a combination of these. Work-up of the chemical reductive alkylation reaction mixtures to obtain the desired products may also be accomplished by known procedures such as precipitation, concentration, solvent extraction, or combinations of these procedures. After isolation, the products may be purified by any of the generally known methods for purification of tetracycline compounds. These include recrystallization from various solvents and mixed solvent systems, chromatographic techniques, and counter current distribution, all of which are usually employed for this purpose.

The new tetracylines of this invention are amphoteric compounds and hence acid-addition salts, that is both mono- and di-salts may be readily prepared with mineral acids such as hydrochloric, sulfuric, and the like although organic acids such as trichloroacetic may also be used. The acid-addition salts may be prepared by treating the new tetracyclines with approximately one equivalent or more of the chosen acid in a suitable solvent.

The invention will be described in greater detail in conjunction with the following specific examples:

Example 1.—Preparation of 7-[1,2-bis-(carbobenzyloxy)hydrazino]-6-demethyl-6-deoxytetracycline A 3.84-gram portion of 6-demethyl-6-deoxytetracycline neutral was dissolved in a mixture of 7.7 milliliters of tetrahydrofuran and 69 milliliters of methanesulfonic acid. The solution was cooled to 0° C. to 5° C. in an ice bath. A solution of 3.32 grams of the dibenzyl ester of azodiformic acid in 3.1 milliliters of tetrahydrofuran was added dropwise while the temperature was maintained at 0° C. to 5° C. The mixture was stirred for 10 minutes and then the reaction was quenched in one liter of ice water. This mixture was extracted with 200 milliliters of butanol followed by three successive 100 milliliter portions of butanol. The combined butanol extract was washed repeatedly with a saturated saline solution and finally with water. The washed butanol extract was evaporated to dryness. The residue was triturated with ether. The solid was filtered off, washed with ether and then dried, yielding 5.55 grams by weight of 7-[1,2-bis-(carbobenzyloxy)hydrazino]-6-demethyl-6-deoxytetracycline.

Paper chromatography showed the presence of a new component. Infrared analysis showed the presence of a strong carbonyl band at 5.85μ and an ester band at 8.2μ.
Ultraviolet analysis:

$$\lambda_{max.}^{0.1\ N\ H_2SO_4}\ 265,\ 344\ m\mu;\ \lambda_{max}^{0.1\ N\ NaOH}\ 248,\ 384\ m\mu$$

Example 2.—Catalytic reduction of 7-[1,2-bis-(carbobenzyloxy)hydrazino]-6-demethyl-6 - deoxytetracycline to 7-amino-6-demethyl-6-deoxytetracycline A 7.0-gram portion of product prepared as described in Example 1 was mixed with 3.5 grams of 5% palladium-on-carbon and 136 milliliters of one normal methanolic sulfuric acid. This mixture was reduced for 4 hours at 20 pounds per square inch hydrogen pressure in a Parr shaker. The catalyst was filtered off and washed with methanol. The filtrate and washings were combined and added to 2 liters of ether. The ether was extracted with water and the aqueous extract was added to butanol. The butanol was reduced to a small volume under vacuum. The product, 7-amino-6-demethyl-6-deoxytetracycline, was filtered off, washed with butanol and ether, dried and then identified by paper chromatography.

Example 3.—Reductive methylation of 7-[1,2-bis-(carbobenzyloxy)hydrazino]-6-demethyl-6 - deoxytetracycline to 7-dimethylamino-6-demethyl-6-deoxytetracycline A solution of 100 milligrams of 7-[1,2-bis-(carbobenzyloxy)hydrazino]-6-demethyl-6-deoxytetracycline in 2.6 milliliters of methanol, 0.4 milliliter of 40% aqueous formaldehyde solution and 50 milligrams of 5% palladium-on-carbon catalyst was hydrogenated at room temperature and 2 atmospheres pressure. Uptake of the hydrogen was complete in 3 hours. The catalyst was filtered off and the solution was taken to dryness under reduced pressure. The residue was triturated with ether and then identified by paper chromatography as 7-dimethylamino-6-demethyl-6-deoxytetracycline.

Example 4.—Preparation of 7-[1,2-bis-(carbethoxy)hydrazino]-6-demethyl-6-deoxyetetracycline A 10-gram portion of 6-demethyl-6-deoxytetracycline was dissolved in 100 milliliters of concentrated sulfuric acid at about 0° C. and the solution was then cooled to −10° C. An 8.14-gram portion of diethyl azodicarboxylate was added dropwise and the mixture was stirred for 5 minutes at −10° C. This mixture was added to 3 liters of ether. The precipitate which formed was filtered off, washed with ether and then dried, yielding 17.63 grams 7-[1,2-bis-(carbethoxy)hydrazino]-6-demethyl-6 - deoxytetracycline as a sulfate salt.

Paper chromatography showed the presence of a new component. Infrared analysis showed the presence of a carbonyl band at 5.85μ and an ester band at 8.2μ.
Ultraviolet analysis:

$$\lambda_{max.}^{0.1\ N\ H_2SO_4}\ 265,\ 344\ m\mu$$

Example 5.—Hydrolysis of 7-[1,2-bis-(carbethoxy)hydrazino]-6-demethyl-6-deoxytetracycline to 7-amino-6-demethyl-6-deoxytetracycline One gram of the product of Example 4 was dissolved in 20 milliliters of 57% hydriodic acid and heated at 105° C. for 2 hours. The mixture was cooled to room temperature and added to 200 milliliters of water. Sodium bisulfite was added and the solution was extracted with 25 milliliters of carbon tetrachloride. The carbon tetrachloride was discarded, the mixture was extracted with eight 25-milliliter portions of butanol and evaporated to a solid residue, yielding 0.45 gram of 7-amino-6-demethyl-6-deoxytetracycline as identified by paper chromatography.

Example 6.—Preparation of 7-[1,2-bis-(carbethoxy)hydrazino]-β-6-deoxy-5-hydroxytetracycline A 0.5 gram portion of β-6-deoxy-5-hydroxytetracycline neutral was dissolved in a mixture of 0.5 milliliter of tetrahydrofuran and 4.5 milliliters of methanesulfonic acid at less than 10° C. The solution was cooled to 0° C. to 5° C. in an ice bath. A 0.242 gram portion of diethyl azodicarboxylate was added dropwise while the temperature was held at 0° C. to 5° C. The reaction mixture was stirred for 5 minutes and then added to ice water. The aqueous solution was extracted with butanol. The butanol extract was washed with saturated saline solution and water and then evaporated to an oily residue under vacuum. This residue was triturated with ether and the solid 7-[1,2-bis-(carbethoxy)hydrazino]-β-6-deoxy-5-hydroxytetracycline was filtered off, dried and identified by paper chromatography.

Example 7.—Preparation of 7-[1,2-bis-(carbethoxy)hydrazino]-β-6-deoxytetracycline A 0.5 gram portion of β-6-deoxytetracycline neutral was dissolved in a mixture of 0.5 milliliter of tetrahydrofuran and 4.5 milliliters of methanesulfonic acid at less than 10° C. The solution was cooled to 0° C. to 5° C. in an ice bath. A 0.242 gram portion of diethyl azodicarboxylate was added dropwise while the temperature was maintained at 0° C. to 5° C. The reaction mixture was stirred for 5 minutes and then added to ice water. The aqueous solution was extracted with butanol. The butanol extract was washed with saturated saline solution and water, and was then evaporated to an oily residue under vacuum. The oily residue was triturated with ether and the solid 7-[1,2-bis-(carbethoxy)hydrazino]-β-6 - deoxytetracycline was filtered off, dried and identified by paper chromatogrpahy.

Example 8.—Preparation of 7-[1,2-bis-(carbobenzyloxy)hydrazino]-11a-chloro-6-demethyl-6-deoxytetracycline A 4.0 gram sample of 11a-chloro-6-demethyl-6-deoxytetracycline was dissolved in 15 ml. of tetrahydrofuran and added to 60 ml. of methanesulfonic acid pre-cooled to 0° C. The stirred mixture was treated dropwise with a solution of 3.2 grams of dibenzyl azodiformate dissolved in 4.0 ml. of tetrahydrofuran. The reaction was conducted for fifteen minutes and then poured into one liter of ice water. When neutralized to pH 5.5 by the addition of 25% aqueous ammonium hydroxide, the product precipitated. When collected by filtration and dried, 5.1 grams of 7-[1,2-bis-(carbobenzyloxy)hydrazino]-11a-chloro-6-demethyl - 6 - deoxytetracycline was obtained. Removal of the 11a chlorine atom by reduction in aqueous alcoholic sodium bisulfite solution yielded 7-[1,2 - bis - (carbobenzyloxy) - hydrazino] - 6 - demethyl-6-deoxytetracycline identical to the product of Example 1.

Example 9.—Preparation of 7-[1,2-bis-(carbamoyl)hydrazino]-6-demethyl-6-deoxytetracycline A solution of 828 mg. of 6-demethyl-6-deoxytetracycline in an ice-cooled mixture of 3 ml. of tetrahydrofuran and 20 ml. of methanesulfonic acid is treated with 278 mg. of azodicarboxamide. The resulting mixture is stirred at 5° C. for 35 minutes and then is poured into 100 ml. of diethyl ether. The gummy lump of solid that forms is washed with diethyl ether and dissolved in the minimum volume of methanol. The solution is poured into diethyl ether, whereupon the desired product separates as yellow solid, $\lambda_{max.}^{CH_3OH}$ 268, 315 m$\mu$; $\lambda_{max.}^{KBr}$ 2.9$\mu$ (NH), 5.92$\mu$ (CONH)

Example 10.—Preparation of 7-[1,2-bis-(carbethoxy)hydrazino]-6-deoxy-6-demethyltetracycline A 828 mg. portion of 6-deoxy-6-demethyltetracycline was dissolved in 20 ml. of 50% sulfuric acid at 0° C. To this stirred solution was added 0.5 ml. of diethyl azodicarboxylate. The reaction mixture was stirred vigorously at 0° C. to 40 minutes and then poured into a mixture of ice and water. The product was isolated by extraction into butanol. The butanol extract was concentrated under reduced pressure to near dryness. Diethyl ether was added and a 1.15 gm. portion of the product was collected by filtration.

Example 11.—Preparation of 7-[1,2-bis-(carbobenzyloxy)hydrazino]-6-deoxy-6-demethyltetracycline A 4.14 gm. portion of 6-deoxy-6-demethyltetracycline was dissolved in 100 ml. of glacial acetic acid. The solution was cooled in an ice-bath and 20 ml. of concentrated sulfuric acid was added at such a rate that the temperature did not exceed 25° C. The solution was then cooled to 0 to 5° C. and a mixture of 4.14 gm. of dibenzyl azodicarboxylate in 5 ml. of tetrahydrofuran was added. The reaction mixture was stored at 5° C. overnight and then poured into 1 liter of water. The mixture was extracted three times with butanol. The combined butanol extracts were washed three times with saturated saline and then three times with water. The butanol was evaporated to dryness and the residue was dissolved in 50 ml. of methanol. The methanol solution was added to 1 liter of diethyl ether and a 6.37 gram portion of the product was collected by filtration.

Example 12.—Preparation of 7-[1,2-bis-(carbobenzyloxy)hydrazino]-6-deoxy-6-demethyltetracycline To a cold (—15° C.) solution of 207 mg. of 6-deoxy-6-demethyltetracycline in 1 ml. of tetrahydrofuran there was added dropwise 3.5 ml. of methanesulfonic acid. The temperature during the addition was not allowed to rise above —15° C. The temperature was then held at 0° C. while a solution of 207 mg. of dibenzyl azodicarboxylate in 0.5 ml. of tetrahydrofuran was added. After ten minutes reaction time, paper chromatographs revealed the presence of the desired product.

Example 13.—Preparation of 7-[1,2-bis-(carbethoxy)hydrazino]-6-deoxy-6-demethyltetracycline A 1.0 gram portion of 6-deoxy-6-demethyltetracycline was dissolved in 15 ml. of trifluoroacetic acid at room temperature. The solution was cooled to 0 to 5° C. and 0.52 gram of diethyl azodicarboxylate was added dropwise. The reaction mixture was stirred at 0° to 5° C. for 18.5 hours and then added to 300 ml. of water. The aqueous solution was extracted with 3× 50 ml. portions of butanol. The butanol extract was evaporated to a residue under vacuum and the residue was then dissolved in 30 ml. of water. The aqueous solution was then adjusted to pH 7.0 with 1 N NaOH and extracted with 3× 15 ml. portions of chloroform. The chloroform extracts were washed with 2× 5 ml. portions of water and evaporated to a solid residue consisting of 0.50 gram of the desired product.

Ultraviolet:

$\lambda_{max.}^{0.1\ N\ H_2SO_4}$ = 266, 312 m$\mu$

Example 14.—Preparation of 7-[1,2-bis-(carbobenzyloxyhydrazino]-6-deoxy-6-demethyltetracycline A 414 mg. portion of 6-deoxy-6-demethyltetracycline neutral was dissolved in 10 ml. of 70% perchloric acid at 0 to 10° C. The solution was warmed to 5° C. and placed in an external ice-water bath. A solution of 414 mg. of dibenzyl azodiformate in 2 ml. of tetrahydrofuran was added. After 10 minutes, the reaction mixture was quenched in 150 ml. of 50% aqueous saline. The product was extracted with 1× 100 ml. and 2× 75 ml. portions of butanol. The product was identified by paper chromatography.

Example 15.—Preparation of 7-[1,2-bis-(carbobenzyloxy)hydrazino]-6-deoxy-6-demethyltetracycline A 414 mg. portion of 6-deoxy-6-demethyltetracycline neutral was dissolved in 7 ml. of trifluoroacetic acid at 0–5° C. A 414 mg. portion of dibenzyl azodiformate in 1.5 ml. of tetrahydrofuran was added and the solution was allowed to stand overnight at 4° C. The reaction solution was poured into water and the precipitated product was collected by filtration and dried in vacuo.

Infrared:

$\lambda_{max.}^{KBr}$ 6.8$\mu$, 8.3$\mu$, 9.5$\mu$

What is claimed is:

1. A compound selected from the group consisting of tetracyclines of the formulae:

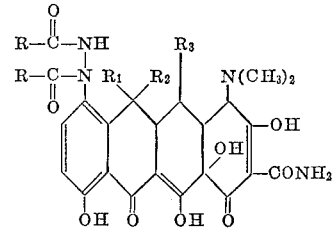

(I)

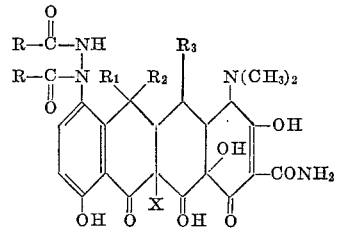

(II)

wherein R is selected from the group consisting of lower alkoxy, phenyl lower alkoxy, phenoxy, amino, lower alkyl amino, phenyl lower alkyl amino and anilino; $R_1$ is selected from the group consisting of hydrogen, $\alpha$-methyl and $\beta$-methyl; $R_2$ is selected from the group, consisting of hydrogen and $\beta$-hydroxy with the proviso that when $R_1$ is $\beta$-methyl then $R_2$ is hydrogen; $R_1$ and $R_2$ taken together is methylene; $R_3$ is selected from the group consisting of hydrogen and hydroxy with the proviso that when $R_3$ is hydroxy then $R_1$ is methyl or $R_1$ and $R_2$ taken together is methylene; and X is selected from the group consisting of fluoro, chloro and bromo.

2. A compound according to claim 1, Formula I, wherein R is benzyloxy and $R_1$, $R_2$ and $R_3$ are each hydrogen.

3. A compound according to claim 1, Formula I, wherein R is ethoxy and $R_1$, $R_2$ and $R_3$ are each hydrogen.

4. A compound according to claim 1, Formula I, wherein R is ethoxy; $R_1$ is $\alpha$-methyl; $R_2$ is hydrogen and $R_3$ is hydroxy.

5. A compound according to claim 1, Formula I, wherein R is benzyloxy; $R_1$ is α-methyl and $R_2$ and $R_3$ are each hydrogen.

6. A compound according to claim 1, Formula I, wherein R is phenoxy; $R_1$ and $R_2$ taken together is methylene and $R_3$ is hydroxy.

7. A compound according to claim 1, Formula I, wherein R is benzyloxy; $R_1$ is β-methyl and $R_2$ and $R_3$ are each hydrogen.

8. A compound according to claim 1, Formula II, wherein R is benzyloxy; $R_1$, $R_2$ and $R_3$ are each hydrogen and X is chloro.

9. A compound according to claim 1, Formula II, wherein R is benzyloxy; $R_1$ is α-methyl; $R_2$ is hydrogen; $R_3$ is hydroxy and X is chloro.

10. The method of preparing a compound according to claim 1 which comprises treating a compound of the formulae:

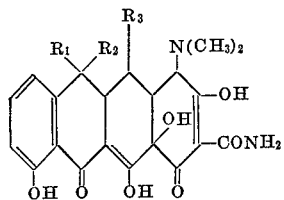

(III)

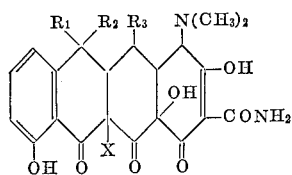

(IV)

wherein $R_1$, $R_2$, $R_3$ and X are as defined in claim 1; with an azodicarbonyl derivative of the formula:

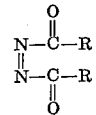

(V)

wherein R is as defined in claim 1; in an acidic medium at a temperature of from about −15° C. to about 25° C. for a period of time of from about 5 minutes to about several hours.

References Cited

UNITED STATES PATENTS 3,239,499   3/1966   Rennhard et al. _____ 260—559

NICHOLAS S. RIZZO, *Primary Examiner.*

A. M. TIGHE, *Assistant Examiner.*